United States Patent [19]

Angelini et al.

[11] 4,368,078

[45] Jan. 11, 1983

[54] PROCESS FOR THE PREPARATION OF VISCOSE AND PROCESS FOR THE SPINNING OF THE VISCOSE THUS OBTAINED

[75] Inventors: Gianfranco Angelini, Buscate; Ugo Paoletti, Monza, both of Italy

[73] Assignees: Snia Viscosa Societa Nazionale Industria Applicazioni Viscosa S.p.A., Milan, Italy; Asahi Kasei Kogyo Kabushiki Kaisha, Osaka, Japan

[21] Appl. No.: 157,109

[22] Filed: Jun. 6, 1980

[30] Foreign Application Priority Data

Jun. 15, 1979 [IT] Italy ................................ 23657 A/79

[51] Int. Cl.³ ............................................... C08L 1/24
[52] U.S. Cl. .................................... 106/164; 106/165; 264/188; 536/60; 536/61
[58] Field of Search ................... 536/60, 61; 106/164, 106/165; 264/188

[56] References Cited

U.S. PATENT DOCUMENTS

| | | | |
|---|---|---|---|
| 2,592,355 | 4/1952 | Tachikawa | 536/60 |
| 2,629,714 | 2/1953 | Robertson | 536/60 |
| 3,395,140 | 7/1968 | Williams | 106/164 |
| 3,835,113 | 9/1974 | Burke et al | 536/60 |
| 4,076,934 | 2/1978 | Mills | 536/60 |

FOREIGN PATENT DOCUMENTS 46-43103  12/1971  Japan .................................... 536/60

*Primary Examiner*—Jay H. Woo
*Attorney, Agent, or Firm*—Wenderoth, Lind & Ponack

[57] ABSTRACT

A process for the xanthation of alkali-cellulose comprises the reaction of the alkali-cellulose with $CS_2$ in excess with respect to the desired xanthate substitution degree at a pressure which increases from the initial 110 mm Hg to about 400–500 mm Hg and at a temperature increasing from about 21° C. to about 23°–25° C. The unreacted $CS_2$ is removed from the reactor, once the desired xanthate substitution degree is reached, by application of a vacuum. This viscose rayon continuous spinning process eliminates the need for the usual desulphuration phase for decreasing the sulphur content and for bleaching the product. The viscose obtained has reduced content of compounds capable of forming elementary sulphur. The regenerated cellulose yarn has improved characteristics as to the sulphur content and degree of whiteness.

12 Claims, No Drawings

PROCESS FOR THE PREPARATION OF VISCOSE AND PROCESS FOR THE SPINNING OF THE VISCOSE THUS OBTAINED

BACKGROUND OF THE INVENTION

1. Field of the Invention

The present invention relates to an improved process for the production of viscose and also relates to a process for spinning of the viscose thus obtained as well to the respective products, viz. the viscose spinning dope itself and the regenerated cellulose yarn obtained through said processes.

2 Prior Art

In the viscose rayon continuous spinning processes, the viscose spinning dope is extruded through suitable spinnerets into a coagulating bath, is subjected to the coagulation and drawing operation in said bath and in subsequent baths, and then is conveyed to a support and advancing apparatus which causes it to travel in an essentially helical path while the yarn undergoes a succession of treatments until it reaches the desired final characteristics. It is known that said treatments also comprise chemical and/or mechanical treatments intended to eliminate or to reduce to a minimum the sulphur content of the finished products and to bleach the yarn itself. Actually it is known that during the viscose preparation process a xanthation i.e. sulphuration stage of the alkali-cellulose is carried out, in which stage sulphur containing by-products are formed besides the cellulosic ester. Some of said by-products form, during the subsequent treatments, and more precisely, during the contacts with the coagulating bath, elementary sulphur besides carbon sulphide and hydrogen sulphide. The presence of elementary sulphur in the finished fiber causes considerable disadvantages, among them serious drawbacks during the fiber dyeing phase and an increased sensitivity of the finished product to the light.

In particular, the sources of sulphur are on the one hand by-products formed during the xanthation of the alkali-cellulose which contains polysulphide linkages (—S—S—), such as e.g. perthiocarbonates ($Na_2CS_{3+x}$), sodium thiosulphate ($Na_2S_2O_3$) and polysulphides ($Na_2S_x$), and on the other hand the hydrogen sulphide, which is generated during the contact with the acid coagulating bath, which also produces sulphur by oxidation. The sulphur produced by the compounds having polysulphide linkages is dispersed in the structure of the fiber and is therefore most difficult to eliminate.

The viscose rayon continuous spinning processes comprise treatments for the elimination or the reduction to a minimum of the sulphur content, which treatments were difficult to carry out since the time that is available for this purpose, e.g. for the contact with the respective chemical treatment agents, especially in high speed spinning, are very short. Further, the need to carry out different chemical treatments in order to impart different desired characteristics to the finished yarn, in zones which are very close to the treatment device, required the use of complicated devices adapted to avoid mixtures or spraying of treatment liquors having different chemical compositions. The resulting apparatus was complicated and expensive and, furthermore involved a high consumption of chemical treatment agents.

SUMMARY OF THE INVENTION

The main purpose of the present invention is to provide a process for the production of the viscose which is adapted to obviate the aforementioned disadvantages of the known art, by providing a viscose having reduced content of harmful sulphur compounds.

Another purpose of this invention is to provide a viscose rayon continuous spinning process which is simplified because the complex treatment phases required for decreasing the sulphur content and for bleaching the finished product are lacking.

A further purpose of this invention is to provide a viscose having a reduced content of compounds capable of forming elementary sulphur, said viscose being particularly adapted as spinning dope for continuous spinning.

Another significant purpose of this invention is to provide regenerated cellulose yarns having improved characteristics as to the elementary sulphur content and the degree of whiteness.

This and other purposes which will better appear hereinafter are achieved by a viscose production process according to the invention which comprises a xanthation phase in which alkali-cellulose is reacted with an amount of $CS_2$ in excess with respect to the desired substitution degree of the xanthate, once this substitution degree has been reached, the unreacted $CS_2$ being removed from the reactor, e.g. by application of a vacuum.

It has been found that in this way the formation of secondary and harmful sulphurated products is thus limited, a ratio of xanthate sulphur to total sulphur being obtained, which is greater and therefore more favourable than that which can be obtained by xanthation of the conventional type wherein all the $CS_2$ introduced into the reactor is caused to react.

DETAILED DESCRIPTION OF THE PREFERRED EMBODIMENTS

Further characteristics and advantages of the invention will be better understood from the following detailed description of preferred embodiments thereof.

The viscose preparation process comprises, as principal stages, the formation of alkali-cellulose, the xanthation or sulphuration of the alkali-cellulose, whereby cellulose-xanthate is obtained, and the dissolution of this latter is diluted sodium hydroxide to form the viscose spinning dope itself.

Said viscose spinning dope will be subsequently spun through suitable spinnerets into an acid coagulating bath, wherein the regenerated cellulose will be obtained, which produces the finished rayon yarn by suitable after-treatments known in the rayon spinning art.

The xanthation is effected, according to the process of the present invention by charging into the reactor the alkali-cellulose which has been carefully disintegrated and depolymerized to the desired average polymerization degree. The temperature of the alkali-cellulose charged into the reactor is about 21° C. The reactor is placed under a vacuum, optionally after washing it with an inert gas, in such a way that a residual pressure of 160 mm Hg will be obtained in the reactor itself. At this stage the $CS_2$ is charged into the reactor in an amount of 33–38% by weight with respect to the cellulose contained in the alkali-cellulose. This means that the amount of $CS_2$ introduced is from 10% to 25% in excess, with respect to the amount required for the desired substitution degree in the xanthate.

The evaporation of the $CS_2$ introduced into the reactor causes an increase of the residual pressure which reaches values comprised between 400 and 500 mm Hg. The temperature increases because the reaction is exothermic and is controlled in such a way as to maintain it between 23° and 25° C.

Once the desired substitution degree in the xanthate has been reached, which substitution degree, for a given amount $CS_2$, a given composition of the alkali-cellulose and a given temperature, is obtained as empirically determined in a given period of time, the excess $CS_2$ is removed from the reactor by suction and is conveyed to a recovery installation. In this way degrees of vacuum practically equal to the initial ones, are once more established in the reactor.

According to a preferred embodiment of the process according to the invention, the residual vacuum in the reaction space is eliminated before this is placed under a vacuum to remove the excess carbon sulphide by introduction of an inert gas, preferably nitrogen, to avoid the formation within the reaction space of a mixture which may be explosive.

After removing the excess carbon sulphide from the reaction space, the process for the formation of the viscose is continued in a conventional manner by introduction of a measured amount of diluted sodium hydroxide for dissolving the cellulose xantate and forming the viscose spinning dope. In this way a viscose spinning dope is obtained in which the sulphur content deriving from by-products capable of forming elementary sulphur is considerably decreased with respect to that which can be obtained by conventional viscose preparation processes.

The way in which the process according to the invention is carried out and its advantages will be better understood from the following examples.

The comparison example is also described, which illustrates a conventional xanthation process.

EXAMPLE 1

In a xanthator, of the type provided with a mechanical stirrer, alkali-cellulose is introduced which contains 15.4% of sodium hydroxide and 31.5% of cellulose.

The vessel is placed under a vacuum until the residual pressure reaches about 160 mm Hg, and thereafter nitrogen is introduced to eliminate the vacuum and bring the pressure back to normal. Subsequently the vessel is once again placed under reduced pressure until a residual pressure of about 110 mm Hg is reached, and at this point the reagent constituted by $CS_2$ is introduced at a temperature of about 21° C. in an amount of 35% by weight with respect to the cellulose of the alkali-cellulose.

The residual pressure in the reactor increases up to about 400 mm Hg. The sulphuration reaction is carried out under stirring for a period of about 110 minutes during which period the temperature increases up to 23° C. At the end of this period nitrogen is introduced into the reactor to remove the vacuum.

Thereafter the vessel is placed under a strong vacuum, up to about 110 mm Hg. of the residual pressure for the purpose of drawing off and removing the excess $CS_2$ which has not reacted with the alkali-cellulose, and which is recovered.

After reaching said minimum pressure the operation continues by the introduction into the reaction vessel of a mesured amount of sodium hydroxide which dissolves the cellulose xantate thus forming the viscose spinning dope.

Subsequently, the vacuum is removed by the introduction of nitrogen and the viscose spinning dope is discharged from the reaction vessel.

The viscose thus obtained has the following sulphur contents:

Total $S=26\%$ on the cellulose of the viscose (which corresponds to an amount of reacted $CS_2$ equal to 88% of the $CS_2$ introduced into the reaction vessel).

Xantate $S=19.5\%$ on the cellulose of the viscose
$S_{Na2CS3}=6.1\%$ on the cellulose of the viscose
$S_{Sx}=$(sulphur of the polysulphides)$=0.09\%$ on the cellulose of the viscose
$S_{S2O3}=$(thiosulphate sulphur)$=0.29\%$ on the cellulose of the viscose.

In the foregoing sulphur content data, the sulphur contained in the compounds having polysulphide contained in the compounds having polysulphide bonds, represented by the two last components of the sulphur balance, is equal to a total of 0.38% by weight referred to the weight of cellulose in the viscose.

Such sulphur content produces in the regenerated cellulose yarns spun from said viscose without any further desulphuration treatment, a total sulphur content of 0.15–0.20% and an elementary sulphur content of 0.03–0.06% by weight referred to the weight of the yarn.

Such sulphur contents correspond to those which can be obtained by the conventional processes only after the application of the desulphuration treatments carried out on the yarn which comes from the coagulation bath.

EXAMPLE 2

The process 1 is repeated with the difference that the sulphuration reaction is carried out until a final temperature of the reaction medium of 25° C. is reached. In this case the reaction is stopped after about 80 minutes.

Subsequently the vacuum is removed and then the carbon sulphide excess is removed as in example 1, by placing the reaction vessel under a vacuum, up to about 120 mm Hg.

Then the process is continued by introducing mixture sodium hydroxide into the vessel for forming the viscose spinning dope.

The viscose obtained according to this example has sulphur contents which are very close to those of example 1.

COMPARISON EXAMPLE

An alkali-cellulose is introduced into the reaction vessel which has the following composition: sodium hydroxide 16%; cellulose 31.5%. The reaction vessel is placed under a vacuum to a residual pressure of about 160 mm of Hg and $CS_2$ is introduced in an amount of 31.5% referred to the cellulose content of the alkali-cellulose. The residual pressure increases up to about 600–660 mm Hg and the temperature reaches a value of about 25° C. The total duration of the reaction is about 80 minutes. At this point sodium hydroxide is introduced for forming the viscose spinning dope.

The cellulose xanthate formed in the reaction and the sodium hydroxide absorb the excess carbon sulphide which is still present.

After removing the vacuum in the vessel by means of nitrogen and discharging the viscose spinning dope, this has the following sulphur contents.

Total $S=26\%$ on the cellulose of the viscose (which represents an amount of the reacted $CS_2$ equal to 98% of the $CS_2$ introduced)

Xantate S=18.7% on the cellulose of the viscose
$S_{Na_2CS_3}$=6.9% on the cellulose of the viscose
$S_{Sx}$=(polysulphide sulphur)=0.17% on the cellulose of the viscose,
$S_{S_2O_3}$=(thiosulphate sulphur)=0.39% on the cellulose of the viscose.

From the contents listed above it is seen that the sulphur containing components having polysulphide bonds capable of forming elementary sulphur which are represented of the last two components of the list, provide a total sulphur content of 0.56% which represents a content greater by almost 50% with respect to that obtained in the previous examples which represent the process of the invention.

In this case it is necessary to desulphurate the yarn produced by spinning this viscose in order to obtain a sulphur content which is contained within acceptable limits, i.e. an elementary sulphur content of about 0.03–0.06% by weight with respect to the yarn.

In a further aspect thereof, the present invention contemplates the continuous spinning process of the viscose obtained by the sulphuration (xanthation) process according to the invention. The continuous spinning process according to the invention comprises spinning of the viscose having a low content of compounds having polysulphide bonds, through suitable spinnerets and coagulating it in an acid bath and is characterized by the fact that it does not require any sulphuration treatment after coagulation. Further, thanks to the characteristics of the starting viscose and to the reduced amount of elementary sulphur which is formed in the coagulation phase, there will be a reduced consumption of bleaching agents.

Advantageously, in the continuous spinning process according to this invention there will be a considerable saving of treatment agents for obtaining a further decrease of the elementary sulphur content of the yarn as well as of the heavy metal sulphides whereby the ash content of the yarn is also decreased, the yarn is extracted from the coagulating bath at a high swelling degree and is subjected to a post-coagulation operation during which the yarn is allowed spontaneously to decrease its swelling while it is out of contact with any bath or chemical treatment agent. In this way the yarn has maintained for as long a time as possible, the permeability condition which has been created during the swelling, condition which permits the discharge by osmosis from the yarn itself of the elementary sulphur and of the heavy metal sulphides. In this post-coagulation phase the spontaneous elimination or discharge of the impurities from the part of the yarn has an asymptotic behaviour and if the post-coagulation time is suitably prolonged up to about 90 seconds it is possible to optimize the post-coagulation phase thus obtaining a further reduction of the contents of impurities present in the finished product, which reduction is in an amount of 50–60% with respect of the yarn which does not undergo said post-coagulation treatment.

From what has been said hereinbefore it is clear that all the purposes are achieved by the process according to the invention. Actually it permits obtaining a viscose having a reduced content of sulphur compounds adapted to form elementary sulphur during the coagulation phase and therefore permits considerably simplifying the continuous spinning process of this viscose by eliminating the desulphuration mechanical and chemical treatments.

Further, thanks to the reduced sulphur content of the product, it has a higher degree of whiteness and requires decreased consumption of bleaching agent. In this way a considerable simplification of the viscose rayon continuous spinning apparatus is also achieved, because of the absence of the rather sophisticated means used in the conventional processes for maintaining separate from one another the treatment operations and phases which follow the coagulation and drawing of the yarn and which are intended to obtain the desired properties of the finished product.

I claim:

1. A process for the xanthation of alkali-cellulose which comprises reacting alkali-cellulose with an amount of $CS_2$ which is in excess of the desired xanthate substitution degree, said reaction being carried out at a pressure which increases during the reaction from an initial pressure of about 110 mm Hg to a final pressure of about 400–500 mm Hg and at a temperature which varies from an initial temperature of about 20° C. to a final temperature of about 23°–25° C. and upon achieving the desired xanthate substition removing unreacted $CS_2$ from the reactor by application of a vacuum.

2. A process according to claim 1, wherein the vacuum existing when the desired xanthate substitution is achieved is eliminated, by introduction of an inert gas, before applying the vacuum for removing the excess $CS_2$.

3. A process for producing viscose which comprises reacting alkali-cellulose with an amount of $CS_2$ which is in excess of the desired xanthate substitution degree, said reaction being carried out at a pressure which increases during the reaction from an initial pressure of about 110 mm Hg to a final pressure of about 400–500 mm Hg and at a temperature which varies from an initial temperature of about 21° C. to a final temperature of about 23°–25° C. and upon achieving the desired xanthate substitution removing unreacted $CS_2$ from the reactor by application of a vacuum and subsequently dissolving the thus formed cellulose xanthate in dilute NaOH.

4. A process according to claim 3, wherein the vacuum applied to remove unreacted $CS_2$ from the reactor is applied to a pressure of about 110 mm Hg.

5. A process according to claim 1, wherein the excess $CS_2$ introduced with respect to the desired xanthate substitution degree is in an amount of 10–25%.

6. A process according to claim 1, wherein the amount of $CS_2$ introduced in the reaction space for the xanthation phase is in the range of 33–38% by weight with respect to the cellulose content in the alkali-cellulose.

7. Viscose obtained by a process according to claim 3.

8. Viscose according to claim 7, wherein the sulphur content deriving from polysulphides and thiosulphates is at the most respectively 0.09% and 0.29% referred to the weight of cellulose in the viscose.

9. In a process for the continuous spinning of viscose rayon comprising a viscose spinning phase and a yarn acid coagulation phase for obtaining regenerated cellulose yarn, the improvement wherein the starting viscose is prepared by the process according to claim 3.

10. A process according to claim 9, wherein a post-coagulation phase is carried out after said yarn acid coagulation phase, in which the yarn having a high degree of swelling is allowed freely to contract without being in contact with any chemical treatment agent.

11. A rayon yarn obtained by a process according to claim 9.

12. A rayon yarn according to claim 11 said yarn having a total sulphur content of 0.15–0.20% and an elemantary sulphur content of 0.03–0.06% by weight with respect to the weight of the yarn.

* * * * *